(12) United States Patent
Gupta et al.

(10) Patent No.: US 9,239,743 B2
(45) Date of Patent: Jan. 19, 2016

(54) METHOD AND ARCHITECTURE FOR EXCEPTION AND EVENT MANAGEMENT IN AN EMBEDDED SOFTWARE SYSTEM

(71) Applicant: ITTIAM SYSTEMS (P) LTD, Bangalore (IN)

(72) Inventors: Puneet Gupta, Bangalore (IN); Sagar Gaonkar, Bangalore (IN); Sreekanth Majji, Visakhapatnam (IN); Sneha Vaidyanathan, Bangalore (IN)

(73) Assignee: ITTIAM SYSTEMS (P) LTD., Bangalore, Karnataka (IN)

( * ) Notice: Subject to any disclaimer, the term of this patent is extended or adjusted under 35 U.S.C. 154(b) by 71 days.

(21) Appl. No.: 13/649,136

(22) Filed: Oct. 11, 2012

(65) Prior Publication Data

US 2014/0109111 A1    Apr. 17, 2014

(51) Int. Cl.
| G06F 3/00 | (2006.01) |
| G06F 9/44 | (2006.01) |
| G06F 9/46 | (2006.01) |
| G06F 13/00 | (2006.01) |
| G06F 9/54 | (2006.01) |
| G06F 11/07 | (2006.01) |
| G06F 11/30 | (2006.01) |

(52) U.S. Cl.
CPC ............ *G06F 9/542* (2013.01); *G06F 11/0736* (2013.01); *G06F 11/0766* (2013.01); *G06F 11/3065* (2013.01); *G06F 2201/86* (2013.01); *G06F 2201/865* (2013.01)

(58) Field of Classification Search
None
See application file for complete search history.

(56) References Cited

U.S. PATENT DOCUMENTS

| 6,918,053 | B1* | 7/2005 | Thatte et al. ...................... 714/16 |
| 7,640,458 | B2* | 12/2009 | Rao et al. .................... 714/38.14 |
| 2005/0015579 | A1* | 1/2005 | Grover et al. ................... 712/244 |
| 2007/0083792 | A1* | 4/2007 | McDermott et al. ............. 714/20 |
| 2009/0187750 | A1* | 7/2009 | Bugnion ......................... 712/244 |
| 2009/0288101 | A1* | 11/2009 | Gandin et al. ................. 719/314 |
| 2010/0306043 | A1* | 12/2010 | Lindsay et al. ............. 705/14.41 |
| 2011/0055640 | A1* | 3/2011 | Huang et al. ..................... 714/49 |
| 2012/0089859 | A1* | 4/2012 | Wang et al. ........................ 714/1 |

* cited by examiner

*Primary Examiner* — H S Sough
*Assistant Examiner* — William C Wood
(74) *Attorney, Agent, or Firm* — Prakash Nama; Global IP Services, PLLC

(57) ABSTRACT

A method for providing a dedicated software framework for exception and event management in an embedded software system is disclosed. In one embodiment, each of exceptions/events originated from users are uniquely identified and severity of the exceptions/events is categorized. The users are software subsystems, software layers and software modules in the embedded software system. Further, information regarding the exceptions/events is reported through various layers, subsystems and modules for use by an application. Furthermore, information associated with one or more of the reported exceptions/events is logged using a logging framework. In addition, the exceptions/events are handled to keep applications running without causing an unexpected behavior in the embedded software system.

32 Claims, 17 Drawing Sheets

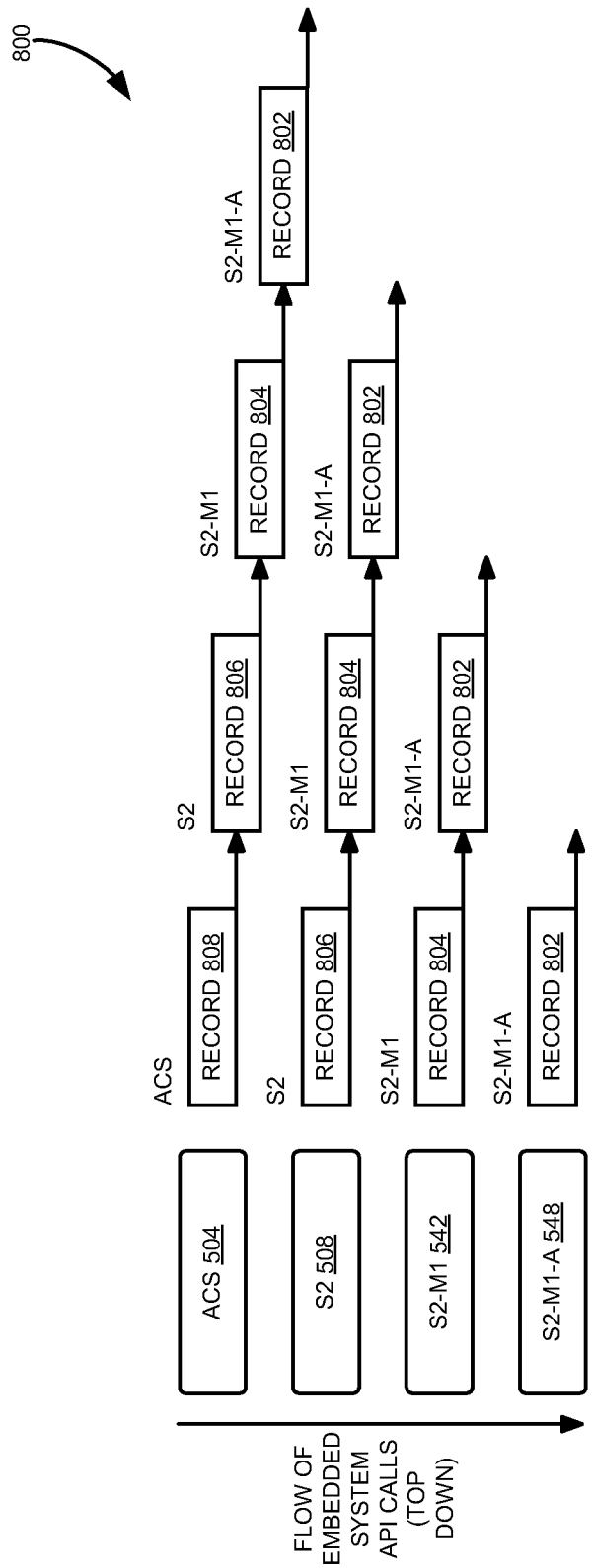

| RESOLUTION 920 | ELEMENT NAME 922 | ELEMENT DESCRIPTION 924 |
| --- | --- | --- |
| 32-BIT UNSIGNED | SOURCE_ID | MODULE/SUB-MODULE FROM WHICH THE EVENT ORIGINATED. |
| 32-BIT UNSIGNED | EVENT_CODE | IDENTIFICATION OF THE NATURE AND CAUSE OF THE EVENT. SEE DESCRIPTION BELOW FOR THE SYNTAX. |
| 32-BIT UNSIGNED | TIMESTAMP | TIME AT WHICH THE EVENT WAS FIRST OBSERVED AT THE SOURCE (SOURCE_ID) MEASURED IN MILLISECONDS FROM A PRE-DEFINED STARTING POINT. |
| POINTER | EVENT_STRING | STRING WITH THE DESCRIPTION OF THE EVENT. EEM INTERNALLY SHALL RESTRICT ITS LENGTH TO K1 BYTES. |
| 32-BIT UNSIGNED | LINE_NUM | LINE NUMBER OF SOURCE FILE WHERE THE EVENT WAS SEEN IN THE SOURCE CODE (SOURCE_ID) |
| POINTER | FILE_NAME | FILE NAME OF SOURCE FILE WHERE THE EVENT WAS SEEN IN THE SOURCE (SOURCE_ID). EEM INTERNALLY SHALL RESTRICT ITS LENGTH TO K2 BYTES. |
| 32-BIT UNSIGNED | LOGGING_TYPE | EVENT LOGGING TYPE FOR THIS EXCEPTION REPORT. THIS COULD BE SET TO:<br><br>1. NONE (DISABLES LOGGING)<br>2. EVENT |

FIG. 9D

METHOD AND ARCHITECTURE FOR EXCEPTION AND EVENT MANAGEMENT IN AN EMBEDDED SOFTWARE SYSTEM

TECHNICAL FIELD

Embodiments of the present subject matter relate to an embedded software system. More particularly, embodiments of the present subject matter relate to a method and architecture for exception and event management in the embedded software system.

BACKGROUND

Typically, for an embedded software system, reliability of operation is critical, especially in the field usage. Any failures or aberrations from the expected behavior (exceptions) need to be reported and handled. This is also relevant in the development and testing phases of systems so that their behavior can be closely monitored, and any improvements made to improve the system reliability are ensured when deployed. Additionally, when special events happen, for example, battery level goes low, in a mobile device, while in use, they need to be reported to the user. In embedded systems, number of such events happening could be more than a few, and they generally require careful management. Further, during development and debugging phases of the products, exception records can provide valuable information regarding the sources of these exceptions, which can facilitate in reducing the time needed for debugging.

Currently, there are no standardized guidelines for how various parts of the software system should generate and report such exceptions and events in embedded software systems. Given that such systems typically comprise of a multitude of layers and components, they pose a considerable challenge to maintain consistency in how these exceptions and events are identified, reported, logged and handled throughout the multitude of layers of software stack. This becomes even more of a concern as the multitude of layers and components may be developed by different teams or developers. In the absence of a unified way to manage these exceptions and events, the reliability of the embedded software systems usually gets limited to the integrator's expertise and attention. Also, in the absence of a pre-defined way to manage these exceptions or events, it is more likely that some of these go unhandled, thus resulting in compromising the reliability of the embedded software system.

BRIEF DESCRIPTION OF THE DRAWINGS

Various embodiments are described herein with reference to the drawings, wherein:

FIG. 8 illustrates a block diagram of generating and reporting exceptions/events across various users in the embedded software system, according to one embodiment;

FIGS. 9A-F illustrate tables including specific details of exception reporting data structures, according to one embodiment;

Figure 1:
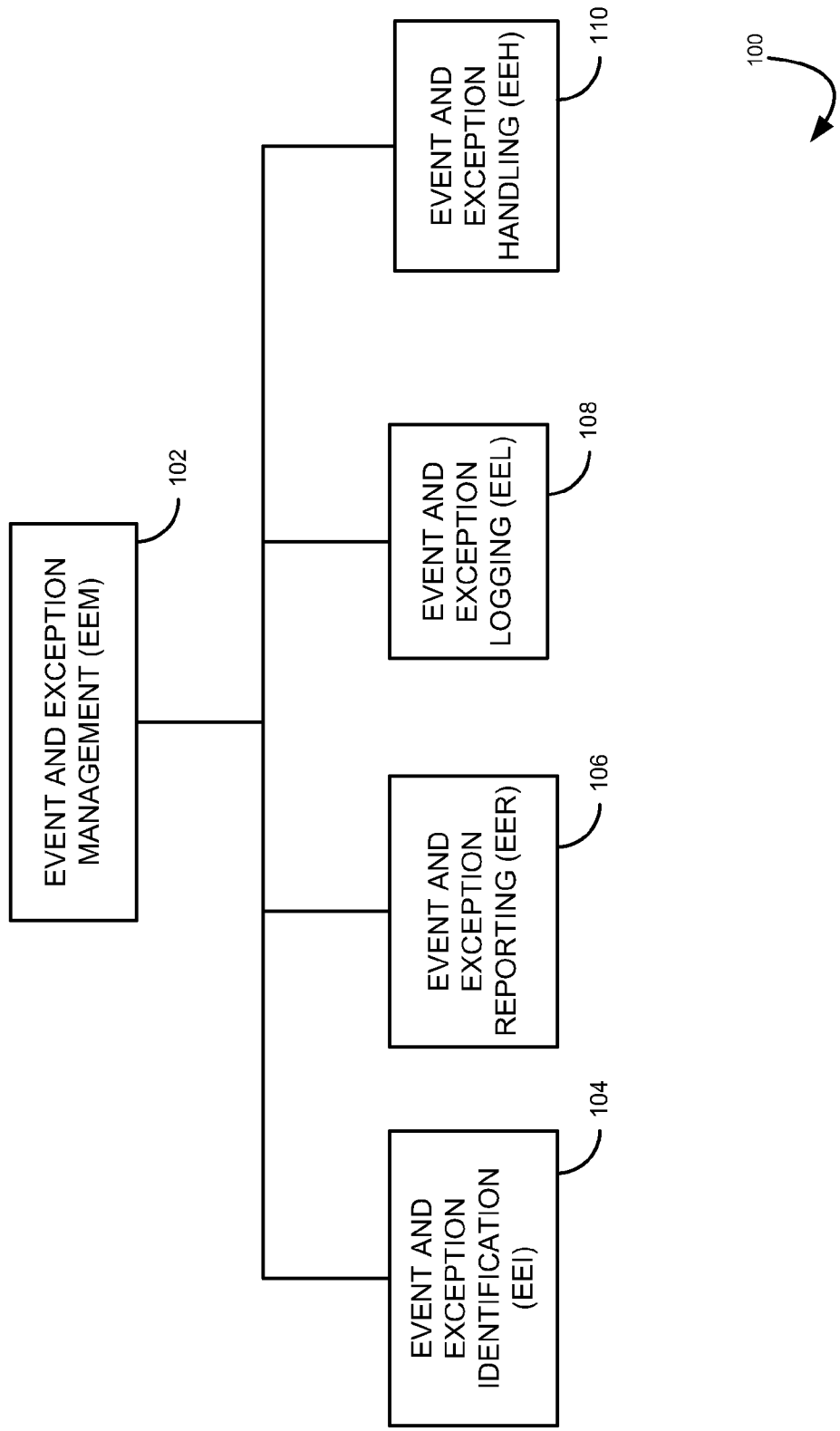
FIG. 1 illustrates a flowchart of a high-level approach to exception and event management in an embedded software system, according to one embodiment.

The systems and methods disclosed herein may be implemented in any means for achieving various aspects. Other features will be apparent from the accompanying drawings and from the detailed description that follow.

DETAILED DESCRIPTION

A method and architecture for exception and event management in an embedded software system are disclosed. In the following detailed description of the embodiments of the present subject matter, references are made to the accompanying drawings that form a part hereof, and in which are shown by way of illustration specific embodiments in which the present subject matter may be practiced. These embodiments are described in sufficient detail to enable those skilled in the art to practice the present subject matter, and it is to be understood that other embodiments may be utilized and that changes may be made without departing from the scope of the present subject matter. The following detailed description is, therefore, not to be taken in a limiting sense, and the scope of the present subject matter is defined by the appended claims.

The term "software sub-module" refers to a functional unit of code, for example, sub-module includes a single function or set of functions and associated code that performs a specific task on the given inputs to yield an output. Further, the term "software module" refers to a group of sub-modules and associated functions that together provide a defined & independent functionality. Furthermore, the term "subsystem" refers to a group of modules and associated functions to support a set of logically related functionality. There may be one or more subsystems within the subsystem. Every subsystem has a well-defined set of APIs that enable the integration of the subsystem into the higher layers and to interact with other subsystems. Additionally, the term "Application Control Software (ACS)" refers to a centralized intelligence and control logic to manage subsystems, modules and sub-modules, and provide a unified man-machine-interface (MMI). Further, the term "exception" refers to an abnormal occurrence during flow of software execution that may affect the functionality, stability or performance". Further, the term "synchronous exception" refers to an exception that occurs in the context of a system API invoked by a user and is to be reported to the user when that API call returns. Furthermore, the term "asynchronous exception" refers to an exception that occurs outside the context of a system API, i.e., the exception occurs during the course of steady state operation of the system. In addition, the term "event" refers to a software indication that some special asynchronous occurrence has happened during steady state operation (though it is not an abnormal behavior) and may be of interest to the user to know about.

The terms "exception/event" and "event/exception" are used interchangeably throughout the document. Further, the terms "record" and "event/exception record" are used interchangeably throughout the document.

FIG. 1 illustrates a flowchart 100 of a high-level approach to exception and event management in an embedded software system, according to one embodiment. At block 102, exception and event management is performed in an embedded software system as follows. At step 104, each of exceptions/events originated from one or more users are uniquely identified and severity of the exceptions/events is categorized. The users include, for example, a software sub system, software layer, software module and software sub-module associated with the embedded software system. At step 106, information regarding the exceptions/events is reported through various users in the embedded software system. At step 108, information associated with one or more of the reported exceptions/events is logged. At step 110, the reported exceptions/events are handled to keep applications running without causing an unexpected behavior in the embedded software system. The steps 102-110 can be executed in any order. An exemplary order of execution of the functions of the event and exception management such as, identification, reporting, logging and handling is shown in FIG. 2.

Figure 2:
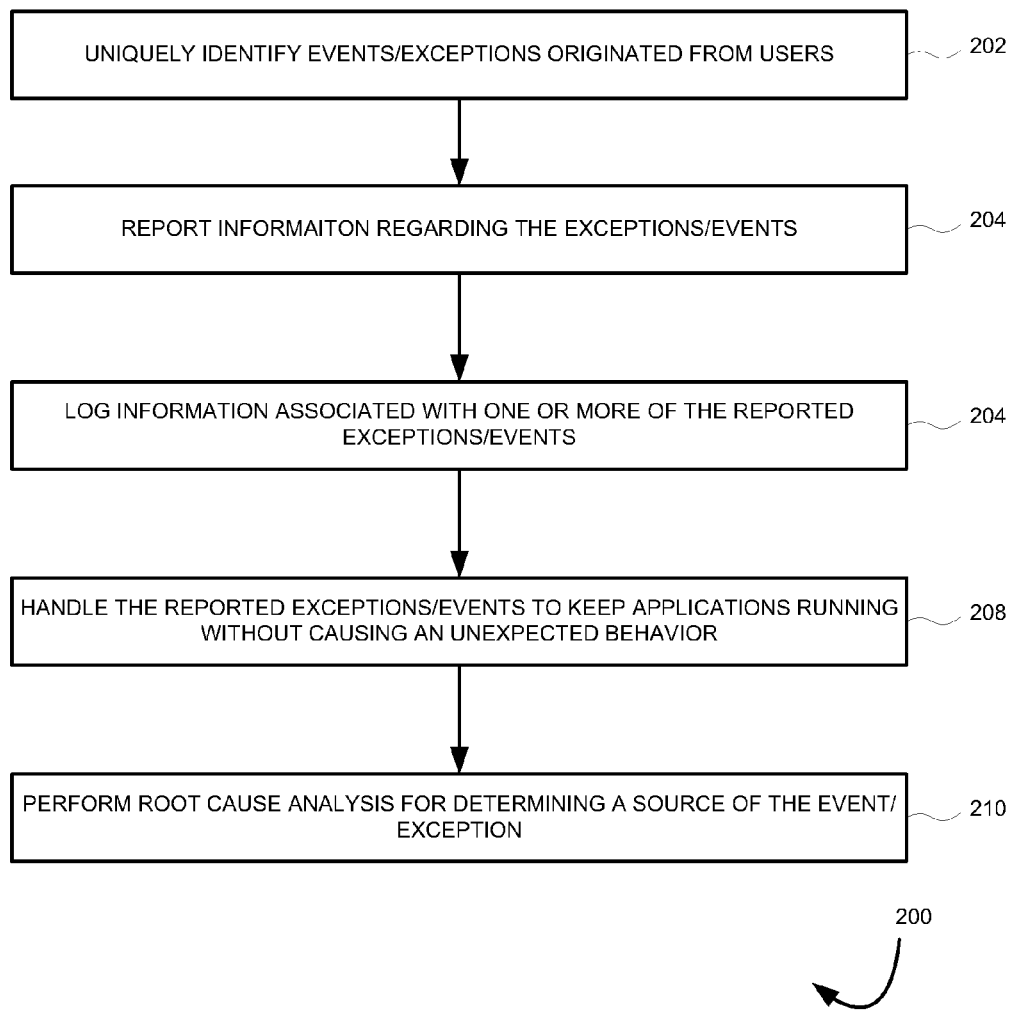
FIG. 2 illustrates a flowchart of a method for providing a dedicated software framework for exception and event management in the embedded software system, according to one embodiment.

Referring now to FIG. 2, which is a flowchart 200 illustrating a method for providing a dedicated software framework for exception and event management in the embedded software system, according to one embodiment. At step 202, each of exceptions/events originated from the users is uniquely identified in terms of its source and severity of the exceptions/events is categorized. In one exemplary implementation, the users in the embedded software system are registered using a unique base identity (ID) during initialization of the users. In one embodiment, the unique base ID is an exception and event based 16-bit base ID. For example, the top four bits of the 16-bit base ID are used to identify up to 16 users, keeping the lower 12-bits to zero. Further, the unique base IDs of the users are used to uniquely identify the exceptions/events generated by the users. Furthermore, each user is provided the ability to extend its unique base ID for its internal modules and sub-modules to further assist in identification of an exact source of exception/event occurrence. In one exemplary embodiment, each user extends the registered 16-bit base ID to its internal modules and sub-modules by updating the 12 lower bits, allowing each user to uniquely identify ($2^{12}$-1) modules and sub-modules within the user. In another exemplary embodiment, the unique base ID may be extended to 24, 32, 64 or another number of bits while applying the same concept. Further, module and sub-module base IDs may be extended to be more than 12 bits out of the total available in the unique base ID. Depending on the unique base ID of the user, it is possible to unambiguously trace the source of any exception/event to a corresponding user and determine a reason behind its occurrence. The process of registration and the format of unique base ID are explained in more detail later in conjunction with FIG. 7.

At step 204, the information regarding the exceptions/events is reported through various layers, subsystems and modules for use by an application. In one embodiment, a record is allocated to a user to fill exception/event information for the purpose of exception/event reporting. For example, the exception/event record includes the associated unique base IDs as well as module or sub-module base IDs where the exception/event is encountered and details, such as a line of code generating the event/exception, a name of a function generating the event/exception, string description of the exception/event in words, exception/event codes, severity of the event/exception, any debug parameters or information associated with the event/exception and the like. The record is a region of memory allocated for reporting exceptions/events. Within the record, each exception/event is identified using the unique base IDs associated with the user from which the exception/event originated. In one exemplary embodiment, the exception/event records are reported using one or more data structures. Further, the same data structures are used by all the users to maintain consistency of reporting, management of the memory for these exception/event records in the embedded software system and deterministic parsing of the exception/event information reported.

In these embodiments, exception/event records created by the users are linked as they propagate across the users of the embedded software system to generate a trace of the flow of exception/event being reported as it traverses through the various users. In linking the exception/event records, an exception/event record created by a user associated with the exception/event origination is returned to a subsequent overlying layer for concatenating its own exception/event record to supplement the information populated in the exception/event record. The above step is repeated at each subsequent overlying layer until linking of the exception/event records of all the subsequent overlying layers is completed. Therefore, when the exception/event record reaches the final layer of the embedded software system, all the exception/event records of the underlying layers are linked. In these embodiments, the exceptions are either synchronous or asynchronous, while the events are asynchronous. The process flow of the synchronous exception is explained in detail with reference to FIG. 3. Further, the process flow of the asynchronous event or an exception is explained in detail with reference to FIG. 4.

At step 206, information associated with one or more of the reported exceptions/events are logged using a logging framework. In one embodiment, the one or more of the reported events/exceptions to be logged are determined. Further, the logged exceptions/events are filtered based on logging criteria. Furthermore, the information associated with the filtered exceptions/events is logged at one or more destinations using the logging framework. The logging framework is explained in detail in conjunction with FIG. 10. In one exemplary embodiment, the information associated with the one or more of the reported exception/events is logged in a batch mode. For example, the exception/event logs are temporarily stored in memory and periodically routed to one or more destinations. Further, the batch mode traces are logged to the one or more destinations in a low priority or background mode to minimize impact on the core processing load of the embedded software system and to ensure that the primary functionality of the embedded software system does not get affected by the logging process.

At step 208, the reported exceptions/events are handled to keep applications running without causing an unexpected behavior in the embedded software system by taking necessary actions. In one embodiment, a hierarchical framework is defined for handling the reported exception/event originating from each of the users based on an invoked user functionality. Further, each of the linked exception/event records is parsed by the overlying user. For example, the event/exception data reported by a user in its record is parsed by the overlying user. Furthermore, appropriate action is taken based on the outcome of the parsing to keep the applications running without causing unexpected behavior. The action to be taken is decided based on the exception/event ID, the source of the exception/event and the reason behind its occurrence. In addition, the exceptions/events generated by each of the users are passed through the hierarchical framework until the exceptions/events are handled. Also, the memory allocated for the record is freed and the normal course of operation is continued upon handling the reported exceptions/events by the user.

At step 210, root cause analysis is performed by one of the layers overlying the user where the event/exception is generated, to determine the source of the event/exception. For example, a topmost layer in the hierarchy of the embedded system software stack performs the root cause analysis, as all the layers below the topmost layer may not be empowered to execute the root cause analysis. In an exemplary implementation, root cause analysis is performed by computing statistical information associated with each occurrence of each exception and event to determine the source of the exception/event. Necessary action may be taken to ensure that all the applications running in the embedded software system run in an expected manner.

Figure 3:
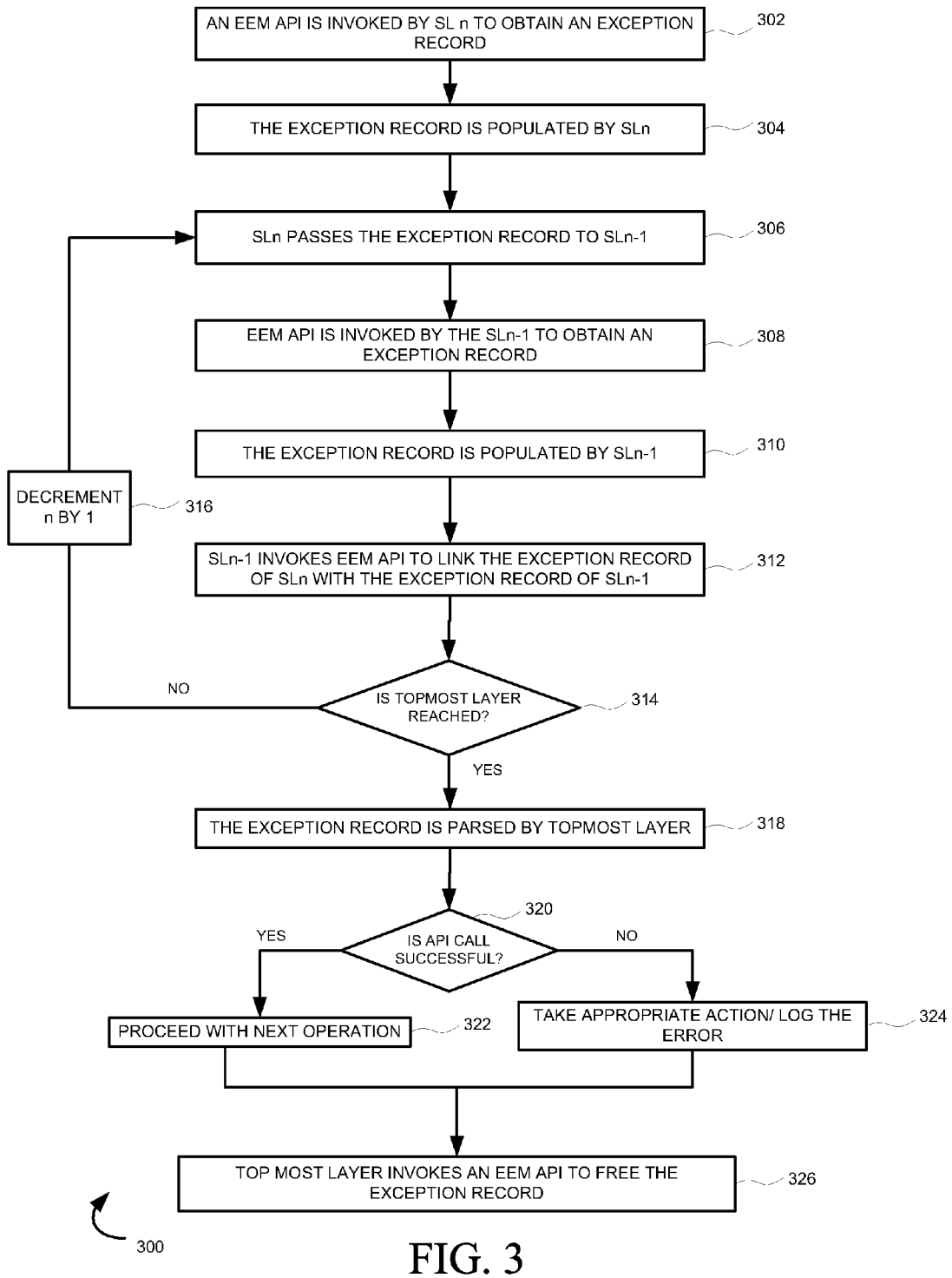
FIG. 3 illustrates a flowchart of a method for reporting synchronous exceptions by an exception and event management (EEM) module, according to one embodiment.

Referring now to FIG. 3, which is a flowchart 300 illustrating a method for reporting the synchronous exceptions by an exception and event management (EEM) module (e.g., an EEM module 510 of FIG. 5), according to one embodiment. The EEM module includes an exception reporting module for reporting the exceptions/events generated by the users registered with the EEM module. In an exemplary scenario, a synchronous exception is generated when an EEM application programming interface (API) (e.g., an EEM API 560 of FIG. 5) is called by one of the users in the embedded software system. For example, the EEM API call is routed down to a user software layer n (SLn) that is a sub-module of a subsystem in the embedded software system. At step 302, the user SLn invokes the EEM API requesting for an exception/event record. At step 304, the user SLn invokes the EEM API to fill up the exception record. At step 306, the user SLn returns the exception record to an overlying user SLn−1. In one embodiment, SLn−1 is a higher software layer as compared to SLn i.e., SLn−1 invokes the interfaces of SLn and not vice versa. At step 308, the user SLn−1 invokes the EEM API to obtain another exception record. Subsequently at step 310, the user SLn−1 populates the exception/event record by invoking the EEM API. After filling the exception/event record, at step 312, the user SLn−1 invokes the EEM API to link the event/exception record received by the lower level user (SLn) with the event/exception record of the user SLn−1.

At step 314, a check is made to determine if a topmost user of the embedded software system is reached. In case the topmost user is not reached, at step 316, the user SLn−1 passes the event/exception record to the overlying user, for example SLn−2, by decrementing the value of n. The process of filling a fresh event/exception record, linking with the previous records and transferring the event/exception record to the next overlying user continues until the topmost user is reached. When the topmost user is reached, at step 318, the exception/event record data from all the underlying users is parsed. At step 320, a check is performed to determine if the API call was successful. In case the API call is successful, at step 322, the user proceeds with the next operation. Alternatively, at step 324, the topmost user finds there is an event/exception mentioned in the exception/event record, the topmost user either takes some action or updates the statistics in the event/exception record. Further, at step 326, the topmost user invokes the EEM API to free the memory allocated for in the event/exception record.

Figure 4:
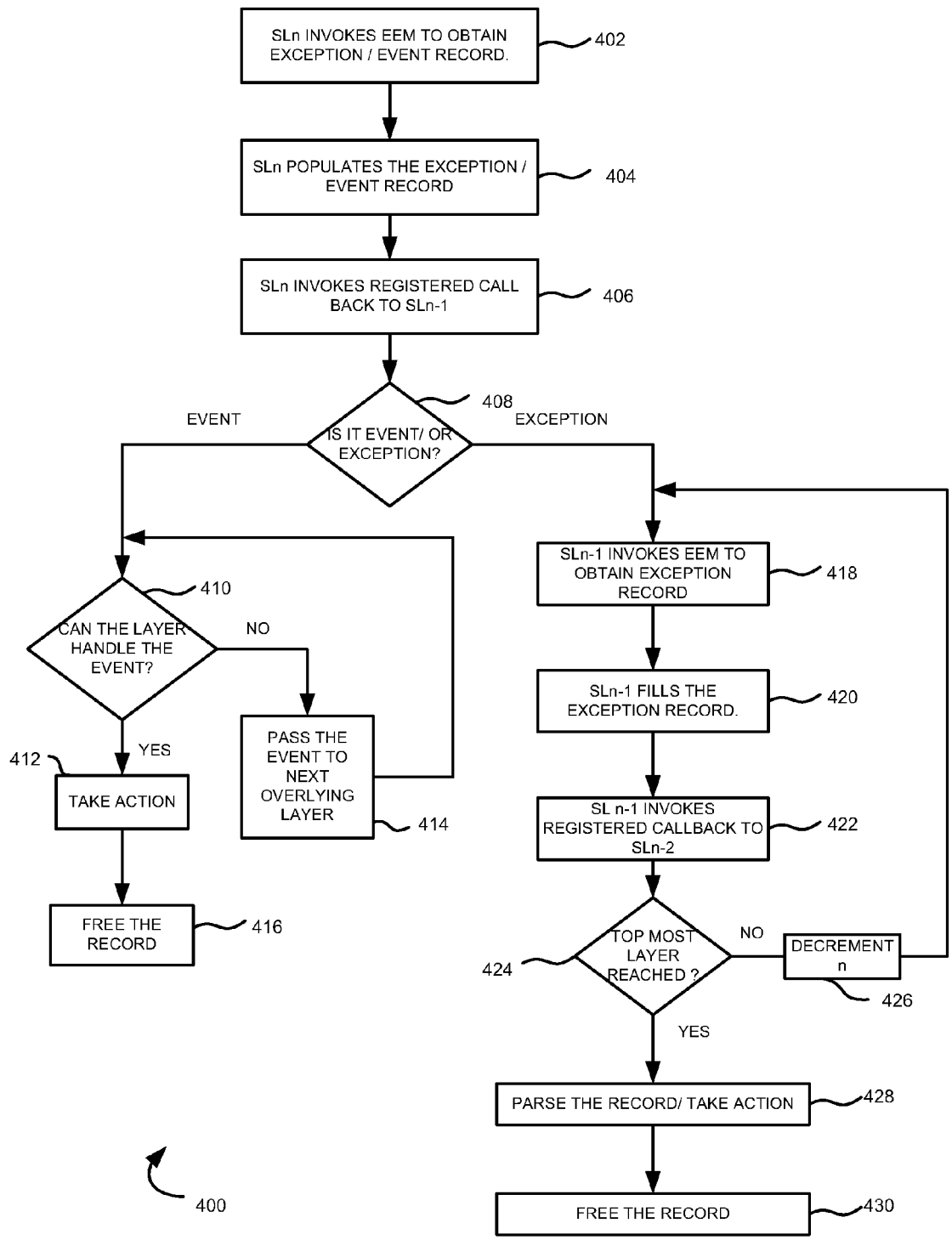
FIG. 4 illustrates a flowchart of a method for reporting asynchronous events and exceptions by the EEM module, according to one embodiment.

Referring now to FIG. 4, which is a flowchart 400 illustrating a method for reporting asynchronous events and exceptions by an EEM module, according to one embodiment. In order to report asynchronous exceptions and events, each registered user in the embedded software system includes a registered callback function to report asynchronous exceptions and the callback is implemented by the overlying users. In an exemplary scenario, an event/exception might have occurred at a user SLn. At step 402, the user SLn invokes an EEM API to obtain an exception/event record. At step 404, the user SLn invokes the EEM API to populate the exception/event record. Subsequently at step 406, the user SLn invokes a registered call back to the overlying layer, for example, a user SLn−1. Upon receiving the registered call back, at step 408, the user SLn−1 checks if the record is generated because of an event or an exception. In case the record is generated due to the event, at step 410, the user SLn−1 checks if the event can be handled. At step 412, if the SLn−1 is not able to provide solution, then the event is passed to a next overlying user, SLn−2 which may implement a solution. Passing of the event to the next overlying user is repeated until a user in the hierarchical architecture handles the event. At step 414, the user that handles the exception takes appropriate action based on the exception. At step 416, if the solution is provided by the user, the memory allocated for the record is freed and the normal course of operation is continued.

In case the record is generated by an exception, then the course of action is as follows. The user SLn−1 receives a registered callback and determines that the record is generated due to an exception. Further at step 418, the SLn−1 invokes an EEM API to obtain an exception record. Thereafter at step 420, the SLn−1 invokes the EEM API to populate the exception record. At step 422, SLn−1 invokes a registered call back to SLn−2. At step 424, a check is made to determine if a topmost user of the embedded software system is reached. Subsequently at step 426, the process of obtaining a record, populating the record and invoking registered call back to the overlying user is repeated till the topmost user is reached. Thereafter, at step 428, the exception record is parsed and root cause analysis is performed to determine the source of the exception. Further, at step 430, memory allocated for the exception record is freed.

Figure 5:
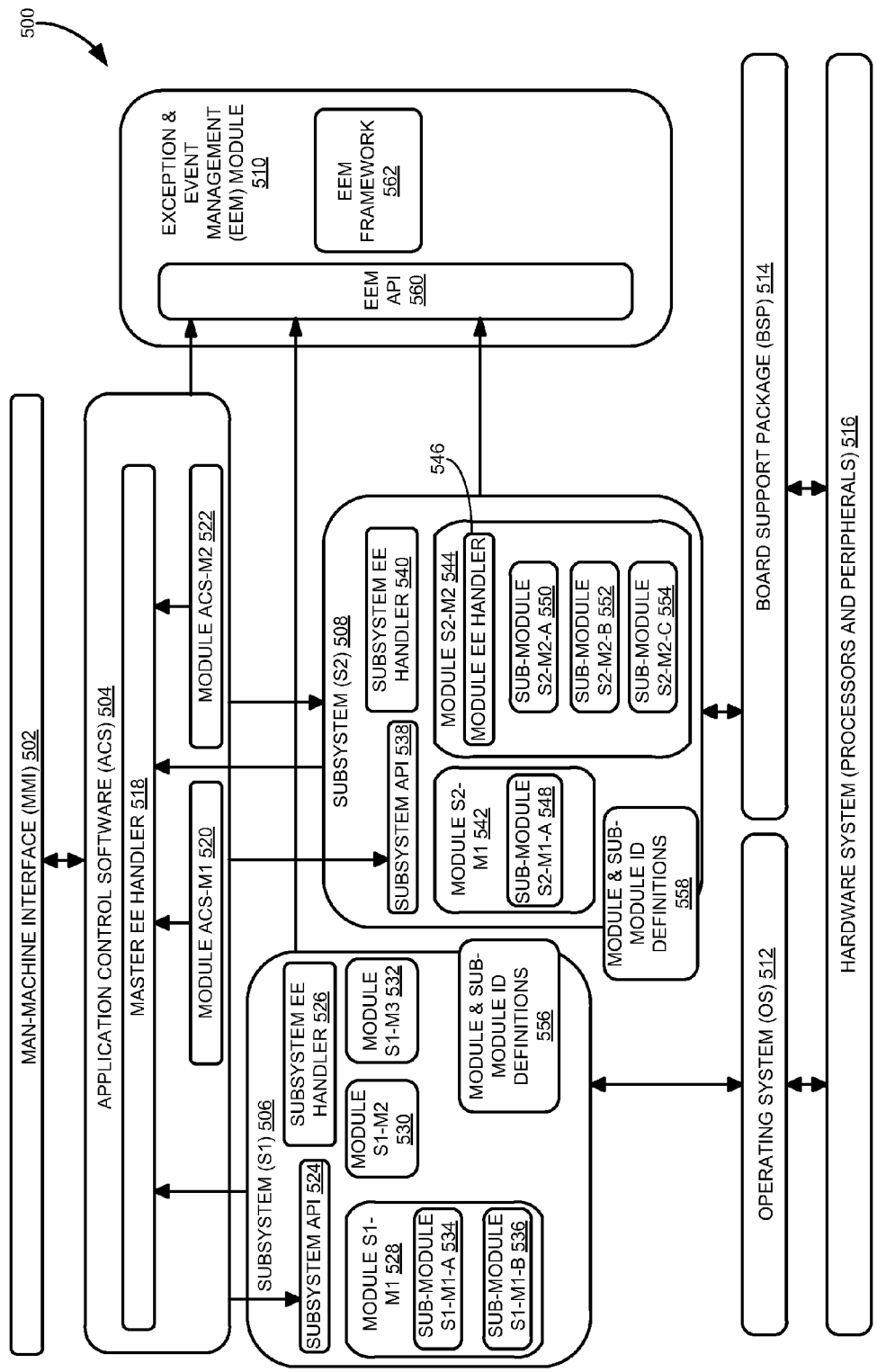
FIG. 5 illustrates a block diagram of an architecture including several types of users including subsystems, modules and software layers for the exception and event management in the embedded software system, according to one embodiment.

Referring now to FIG. 5, which is a block diagram 500 illustrating an architecture including several types of users including subsystems, modules and software layers for the exception and event management in the embedded software system, according to one embodiment. As shown FIG. 5, the embedded software system 500 runs on a hardware system 516, including one or more processors, cores and associated peripherals. Further as shown in FIG. 5, the hardware system 516 is communicatively coupled to an operating systems (OS) 512 and a board support package (BSP) 514. The embedded software system could be single or multiple-process, and in general a multi-threaded implementation. Furthermore, the OS 512 and BSP 514 are communicatively coupled to one or more subsystems, such as subsystem (S1) 506 and subsystem (S2) 508. Also as shown in FIG. 5, subsystems S1 506 and S2 508 are operatively coupled to an application control software (ACS) 504 to facilitate smooth working of the embedded software system. As shown in FIG. 5, the ACS 504 includes a master event and exception (EE) handler 518, ACS-M1 module 520 and ACS-M2 module 522. Further as shown in FIG. 5, the subsystem S1 506 includes a subsystem API 524, subsystem EE handler 526, module S1-M1 528, module S1-M2 530 and module S1-M3 532. Furthermore, the module S1-M1 528 includes a sub-module S1-M1-A 534 and sub-module S1-M1-B 536. The subsystem S1 506 also includes a module and sub-module identity (ID) definitions module 556 which includes module and sub-module ID definitions. Similarly, the subsystem S2 508 includes a sub-system API 538, a subsystem EE handler 540, a module S2-M1 542, and a module S2-M2 544. Further, the module S2-M1 542 includes a sub-module S2-M1-A 548. Furthermore, the module S2-M2 544 includes a module EE handler 546, sub-module S2-M2-A 550, sub-module S2-M2-B 552 and sub-module S2-M2-C 554. Additionally, the subsystem S2 508 includes a module and sub-module ID definitions module 558. Now, the subsystem S1 506, the subsystem S2 508 and the ACS 504 are coupled to an EEM API 560. The EEM API 560 serves as a means to invoke all functionality exported by the EEM module 510. Further, the EEM module 510 includes the EEM framework 562 that facilitates all the event and exception management activities exported through the EEM API 560.

In an implementation, the users, which include the subsystems, modules and sub-modules of the embedded software system shown in FIG. 5, are those software entities that invoke the functionality provided by EEM to get access to event and exception management in the embedded software system. Further, the EEM module 510 is configured to identify, report, log and handle the exceptions/event generated by one or more users. For example, the EEM module 510 is configured to interact with the users through one or more EEM APIs. The EEM module 510 is explained in more detail in FIG. 6.

Figure 6:
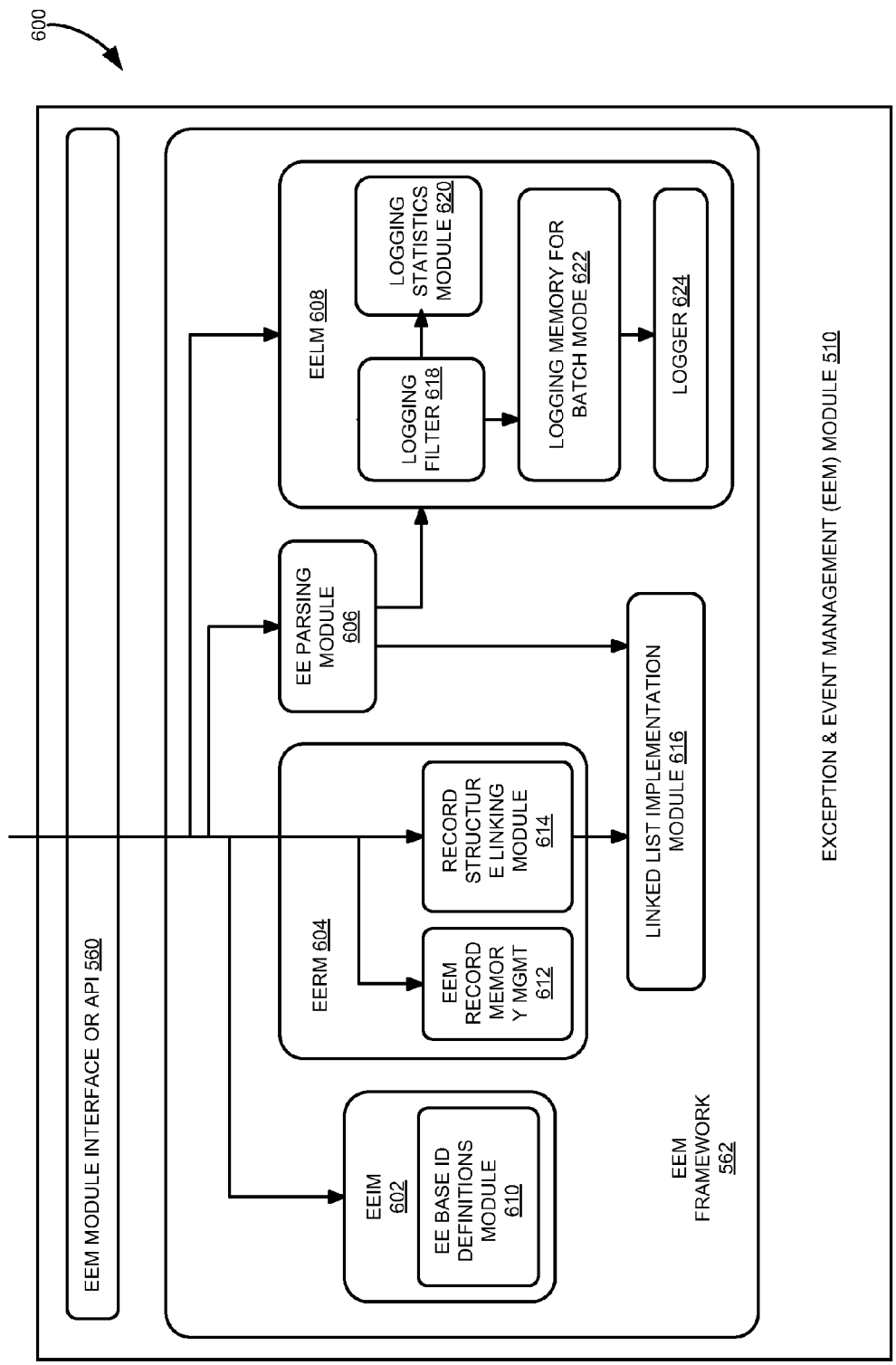
FIG. 6 illustrates a block diagram of the EEM module, such as shown in FIG. 5, including major components and external and internal interfaces, according to one embodiment.

Referring now to FIG. 6, which is a block diagram 600 illustrating the EEM module 510, such as shown in FIG. 5, including major components and external and internal interfaces, according to one embodiment. The EEM module 510 interacts with the embedded software system though the EEM API 560. In an exemplary embodiment, the EEM framework 562 includes an event and exception identification module (EEIM) 602. Further, the EEIM 602 includes an EE base ID definitions module 610. Furthermore, the EEM framework 562 includes an event and exception reporting module (EERM) 604, which includes sub-modules such as an EEM record memory management module 612 and a record structure linking module 614. Additionally, the EEM framework 562 includes an event and exception parsing module (EEPM) 606. The EEM framework 562 further includes an event and exception logging module (EELM) 608, which includes sub-modules such as, a logging filter 618, a logging statistics module 620, a logging memory for batch mode 622 and a logger 624.

In an embodiment, the EEIM 602 is designed to uniquely identify each of the exception/events originated from users to locate the source of any exception/event down to the level of specific sub-modules. Further, EERM 604 is designed to report information regarding the exceptions/events in a well-defined format of records through various layers, subsystems and modules. Furthermore, EEPM 606 is designed to parse each exception and event upon request by a user. Additionally, EELM 608 is designed to log information associated with the exceptions/events using a logging framework.

In an embodiment, the EEIM 602 provides a centralized mechanism for identifying events and exceptions. One or more users, for example, a software sub-module, a software layer and a software module of the embedded software system registers with the EEM module 510. Thereafter, the EEIM 602 assigns a unique base ID for each of the users that register with the EEM module 510. Subsequently, the users optionally assign the unique base IDs to one or more internal modules associated with the user using unique base ID of the user as the starting address. An exemplary range of the unique base IDs for the internal sub-modules of a user is (base ID+0x0001) to (base ID+0x00FF).

Figure 7:
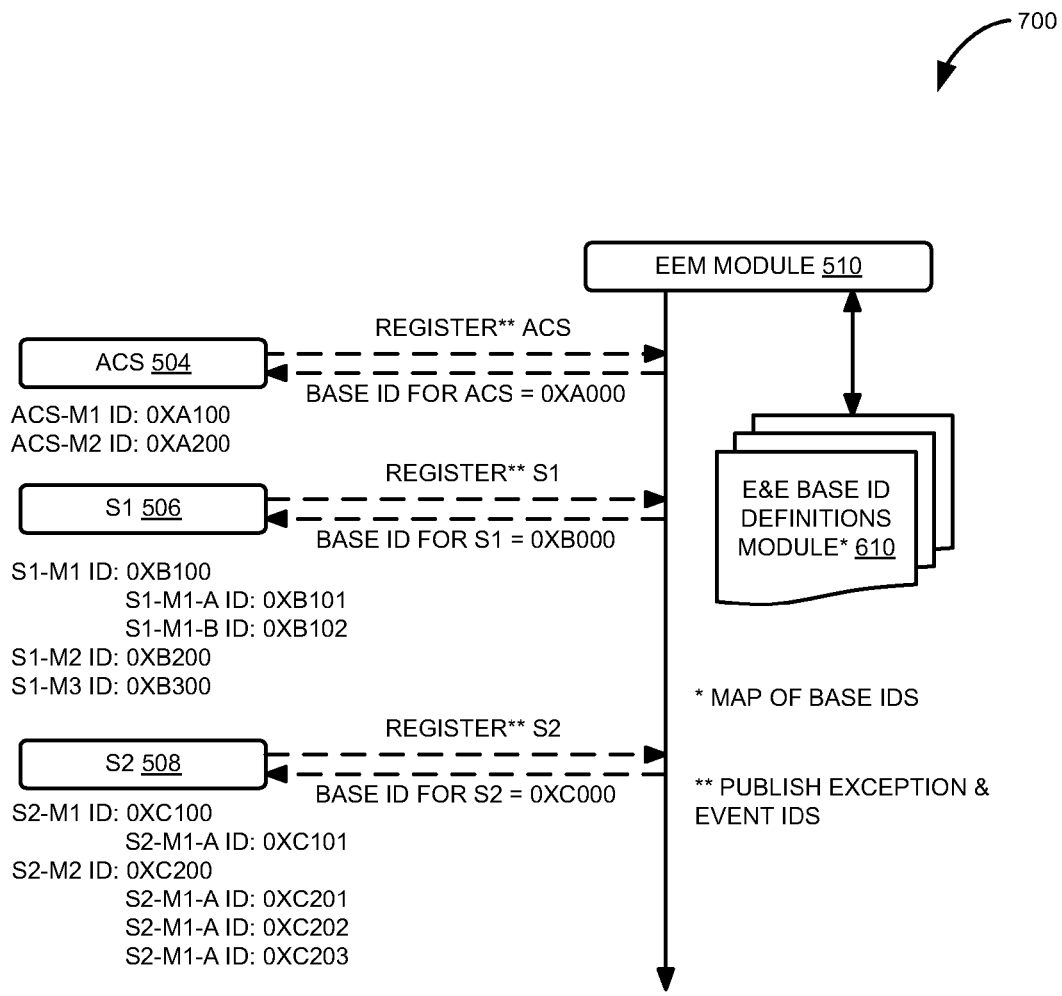
FIG. 7 illustrates a block diagram of registration of users with the EEM module and exception/event identification, according to one embodiment.

Referring now to FIG. 7, which is a block diagram 700 illustrating registration of users with EEM module 510 and exception/event identification, according to one embodiment. In an exemplary scenario in accordance with FIG. 7, the ACS 504, subsystems S1 506 and S2 508 register with the EEM module 510. Accordingly, the EEIM 602 assigns unique base IDs 0XA000, 0XB000 and 0XC000 to the ACS 504, S1 506 and S2 508, respectively. Thereafter, the ACS 504 extends the unique base IDs to one or more sub-modules associated with the ACS 504. The ACS 504 assigns a base ID of 0XA100 to sub-module ACS M1 520 and a base ID of 0XA200 to sub-module ACS M2 522. Similarly, the modules S1 506 and S2 508 also assign a range of unique IDs keeping the starting address as the unique base ID of the modules S1 506 and S2 508, as illustrated in FIG. 7. In an embodiment, the EEM module 510 stores the unique base IDs assigned to the users in the EE base ID definitions module 610.

Referring now to FIG. 8, which is a block diagram 800 that illustrates generating and reporting exceptions/events through various software layers (users) in the embedded software system, according to one embodiment. In an embodiment, an exception/event is generated at the user S2-M1-A 548. Further, the user S2-M1-A 548 requests the EEM module 510 to allocate a record 802 and populates the record 802 with the details of the exception/event. Thereafter, the user S2-M1-A 548 transfers the record 802 to the overlying user S2-M1 542. Furthermore, the user S2-M1 542 requests the EEM module 510 to allocate a record 804 and populates the record 804 with the details its own event/exception along with the exception/event information associated with the underlying user S2-M1-A 548. Subsequently, the user S2-M1 542 concatenates the record 802 with the record 804 by invoking the EEM module 510. Thereafter, the user S2-M1 542 passes the concatenated record to the overlying user S2 508. The process of creating a new record, linking the new record with the concatenated records and passing the record to the overlying user is repeated over all subsequent overlying users, for example, S2 508 and ACS 504. The record is in the form of a linked list including records of all the users associated with the exception/event. Further, the user ACS 504 parses the record to extract details of the exception/event that occurred at user S2-M1-A 548, S2-M1 542, S2 508 and ACS 504. Upon parsing the record, the record is destroyed.

Figure 9A:
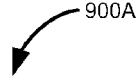

Referring now to FIGS. 9A-F, which are tables 900A-F respectively, illustrate specific details of exception/event reporting data structures, according to one embodiment. One or more data structures are used to report an event/exception that occurs in the embedded software system. Particularly, in an embodiment, an exception structure is as illustrated in FIG. 9A. A field 902 depicts a resolution of the exception reporting data structure, field 904 depicts a name of the exception reporting data structure and field 906 denotes an element description of the exception reporting data structure.

Figure 9B:
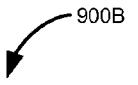
Figure 9C:
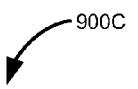
Figure 9E:
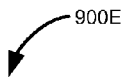
Figure 9F:

Particularly, in an embodiment, FIG. 9B illustrates a structure of an exception code. For example, 32 bits are allocated for the exception reporting data structure. As shown in FIG. 9B, 8 bits starting from bits 31-24 are reserved for debugging purposes or future extensions, 4 bits starting from bits 23-20 are allocated to represent a type of the exception and the remaining 20 bits, bits starting from 19-0 are allocated to represent the value of the exception. The value of the exception represents a reason due to which the exception was generated. Further, FIG. 9C illustrates a few exemplary exception types. In FIG. 9D, the field 920 illustrates the resolution of an event reporting data structure. Further, a field 922 illustrates the name of the event reporting data structure. Furthermore, a field 924 illustrates the element description of the event reporting data structure. FIG. 9E illustrates a general structure of an event code. For example, 32 bits are allocated for the event reporting data structure. As shown in FIG. 9B, 8 bits starting from bits 31-24 are reserved for debugging purposes or future extensions, 4 bits starting from bits 23-20 are allocated to represent a type of the event and the remaining 20 bits (bits starting from 19-0) are allocated to represent the value of the event. The value of the event represents a reason due to which the event was generated. Further, FIG. 9F illustrates a few exemplary event types.

Figure 10:
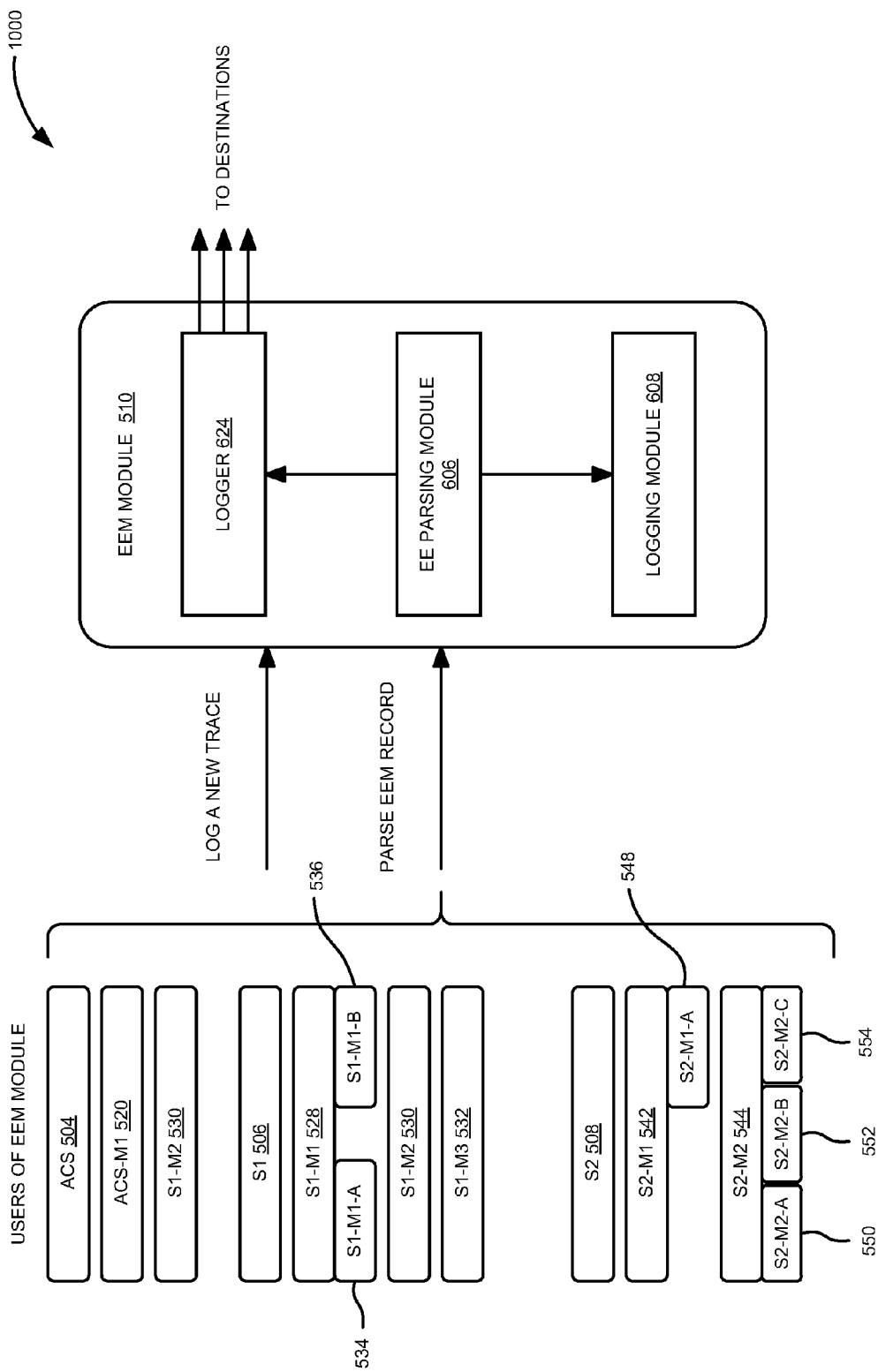
FIG. 10 illustrates a block diagram of exception and event logging and parsing, according to one embodiment.

Referring now to FIG. 10, which is a block diagram 1000 illustrating exception and event logging and parsing, according to one embodiment. In an exemplary implementation, all the users in the embedded software system have access to standardized interfaces of the EELM 608. Pre-configured rules and policies are defined in the EELM 608 for maintaining consistency in one or more log records. Users of the embedded software system use one or more fields in the structure of the log record for defining the type of log that is recorded. In an exemplary implementation, the fields in logs are NONE (disables logging), ERROR (all traces in the category of ERROR need to be logged), WARNING (all traces in the category of ERROR and WARNING need to be logged), EVENT (all traces in the category of EVENT need to be logged), INFORMATIONAL (all traces in the category of ERROR, WARNING, EVENT and INFORMATIONAL need to be logged), OTHER (any other general purpose traces). The logging filter 618 (shown in FIG. 6) is used to determine if the log record is to be saved or discarded. For example, a rule may be implemented in the logging filter 618 to allow only event logs and error logs to be sent for logging, while discarding other log types.

The EELM 608 supports logging the exception/event records at one or more destinations, for example, logging the exception/event records at a standard output terminal, writing the records to a file, sending the records to a destination over a network connection, writing to a pre-defined region in the memory or any combination of these destinations. More than one destinations of each type (file, network, memory) may also be chosen. In an exemplary implementation, the EEPM 606 parses the linked list of the exception/event records in order to figure out the information that needs to be furnished in the record. The EEM module 510 implements a standard syntax (format) for the information to be logged from exception/event records that the EEPM 606 is currently parsing. In an exemplary embodiment, the format is as below:
<Log Prefix> '['<Log Type> ']' '['<Log Timestamp> ']' '['<Log Source> ']'<Log Description and Parameters>
The field <Log Prefix> is populated by the system that is filling the exception/event record. The <Log Type> field describes the nature of the log, for example, ERROR log—"Error", WARNING log—"Warning", EVENT log—"Event", INFORMATIONAL log—"Info"/, OTHER—"Log" and so on. The <Log Timestamp> field prints the value of the time at which the entry in the record was made. For example, timestamps may be printed in decimal offsets from a predefined reference. The <Log Source> field prints the unique base ID of the user making the entry into the record. The <Log Description and Parameters> field includes a description message that may be stored in the in the descriptor field of the exception/event record along with associated parameters values that may be useful to analyze the cause of occurrence of the exception/event from the logs. In an exemplary embodiment, the standard syntax for logging an error event is as below:
VIDEO-PHONE[Error][32204552445][0x3001]ACS-M1:
Unable to allocate memory (Requested Size=0x4008, Free=0x3804).
Where, VIDEO-PHONE is the <Log Prefix> field indicating the type of device reporting the error, [Error] is the log type, that denotes that the log is an error log, [32204552445] is the log time stamp at the time of entry of the error in decimal format, [0x3001]ACS-M1, is the unique ID of the user where the error log originated. "Unable to allocate memory", is the error descriptor of the error log in the exception/event record and (Requested Size=0x4008, Free=0x3804) is the parameter associated with this descriptor. In some embodiments, some examples of error log syntax are as below:
DVR[Info][32367437756][0x7020]S2-M1-A: Reached GOP boundary (Last GOP size=32).
SERVER[Event][34204552769][0x1031]S2-M2-B:Detected video decode failure (Code: 0x1022).
The fields are as explained in the previous example.

In an embodiment, the EEM module 510 performs logging in a batch mode. In the batch mode, the EEM module 510 temporarily writes the incoming logs to a region in memory, such as logging memory for batch mode 622, and periodically routes the logs stored in the memory to a predefined destination. The batch mode is executed so that the event of logging does not impact the overall system performance. Additionally, the EEM module 510 provides functionality to log the statistics corresponding to the exception/event logs generated in the embedded software system. In an exemplary implementation, the logging of statistics associated with the exceptions/events is performed by the logging statistics module 620. In an exemplary scenario, the log statistics are used by developers and system architects to optimize system performance. Further, log statistics are accessed and utilized offline to perform any calculations.

Figure 11:
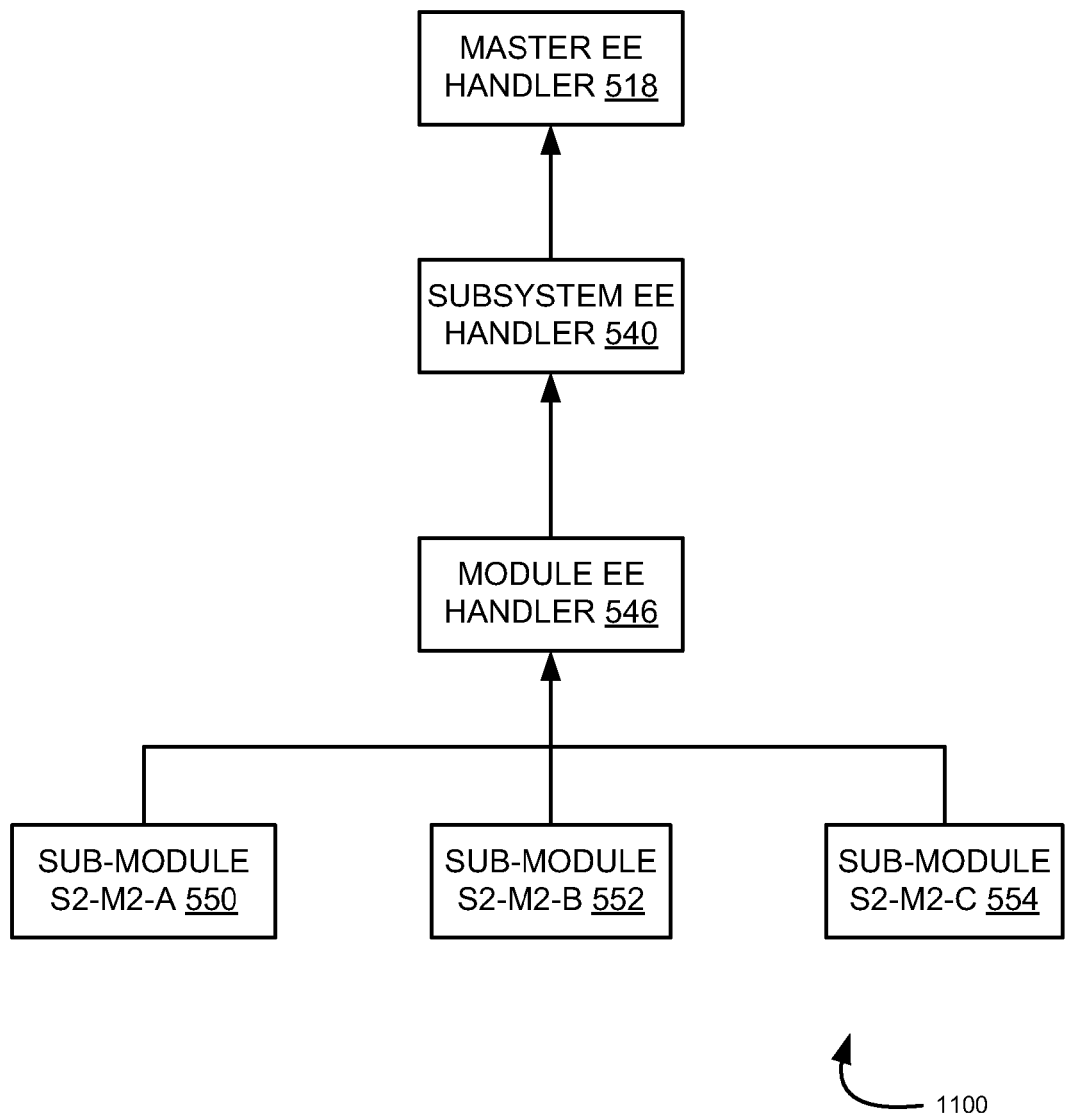
FIG. 11 illustrates a block diagram of a hierarchical approach in handling the events/exceptions, according to one embodiment.

Exception and event handling module (EEHM) addresses the exception/event. The EEHM is placed at various users and sub-modules in the architectural hierarchy of the embedded software system, which may be deemed suitable to handle a particular kind of exception/event. Referring now to FIG. 11, which is a block diagram 1100 illustrating a hierarchical approach in handling the events/exception, according to one embodiment. For example, the lowest level of EEHM shown is in the module S2-M2 544, which is the module EE handler 546. Further, the exceptions/events raised by sub-modules S2-M2-A550, S2-M2-B552 and S2-M2-C554 are handled by a module EE handler 546. Any exceptions/events not handled by the module EE handler 546 of subsystem S2 508 shall be further relayed to and handled by the subsystem EE handler 540. Further, exceptions that are not handled by the subsystem EE handler are relayed to the master EE handler 518, which is a part of the ACS 504. In an exemplary scenario, the user (S2-M2-A 550), where an exception/event occurs, is not able to handle the event/exception the user depends on an overlying user (S2-M2 544) to handle events/exceptions. In case the overlying user (S2-M2 544) is not able to handle the exception/event, the overlying user may further relay the exception/event to the next overlying user (S2 508) in the architectural hierarchy of the embedded software system. Therefore, exceptions/events that are generated may have to travel through several users before they are handled. In some embodiments, the topmost user, in this case ACS 504 including the master EE handler 518 is required to handle all the exceptions/events that are passed from underlying users. In cases where the exceptions/events are handled by any of the intermediate users, the overlying users are reported for bookkeeping purposes.

Figure 12:
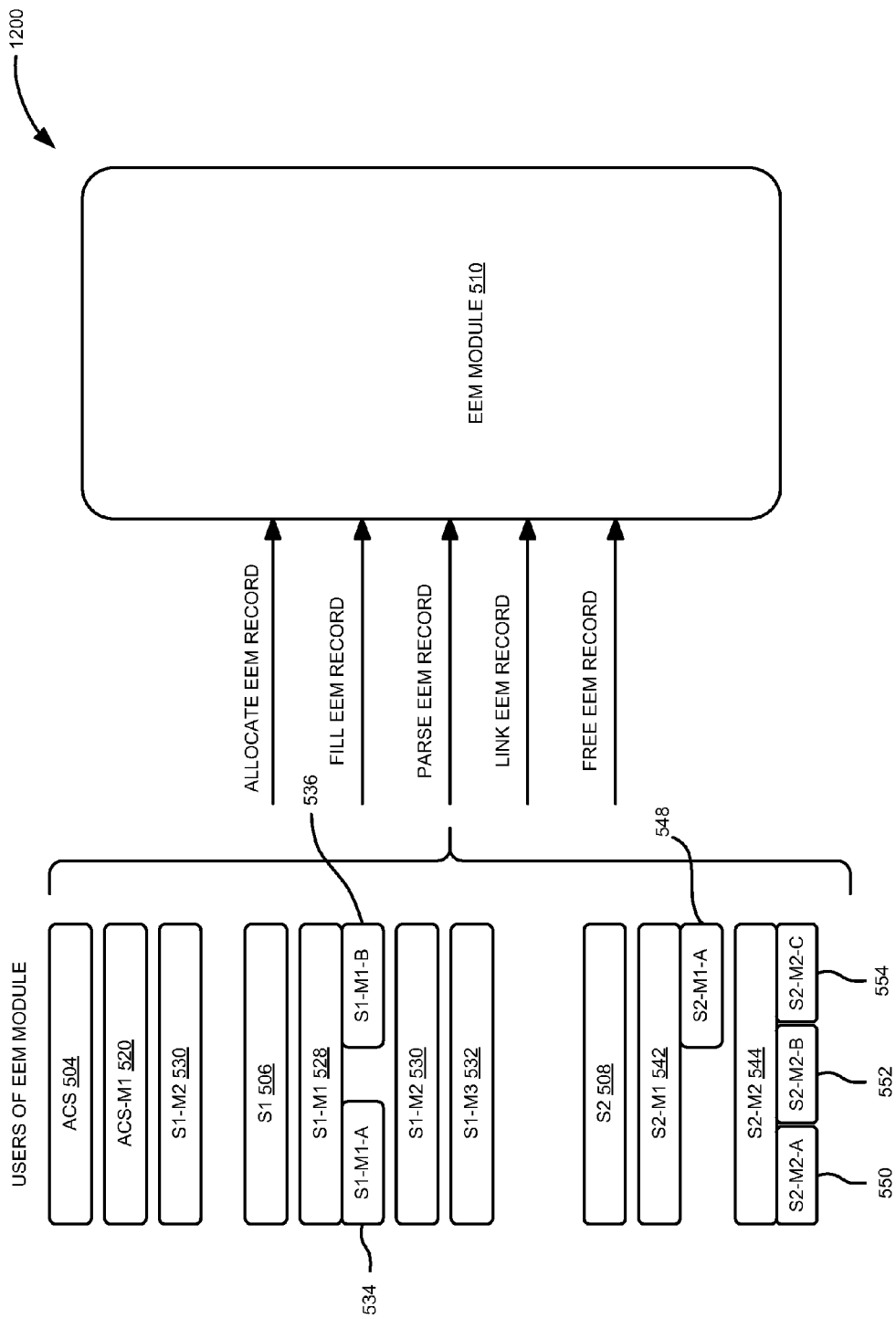
FIG. 12 illustrates a block diagram of standard EEM application programming interfaces (APIs) provided to all the users registered with the EEM module for exception/event reporting, handling and parsing, according to one embodiment.

Referring now to FIG. 12, which is a block diagram 1200 illustrating standard APIs provided to all the users registered with the EEM module 510 for exception/event reporting, handling and parsing, according to one embodiment. The EEM module 510 (as shown in FIG. 5), provides standardized functionality to all the users registered with the EEM module 510. When an exception/event is generated in the user, the EEM API 560 is called for allocating an exception/event record. Thereafter, the user invokes the EEM API 560 for filling the exception/event record. In case the exception/event record is sent to an overlying user, the overlying user invokes the EEM API 560 to link the exception/event record generated in the overlying user with the exception/event record passed from the underlying user. Subsequently, when the user intends to handle the exception/event, the user invokes the EEM API 560 for parsing the exception/event record. After parsing the exception/event record, the user takes necessary action to address the exception/event raised and call the EEM API 560 to free the exception/event record.

Figure 13:
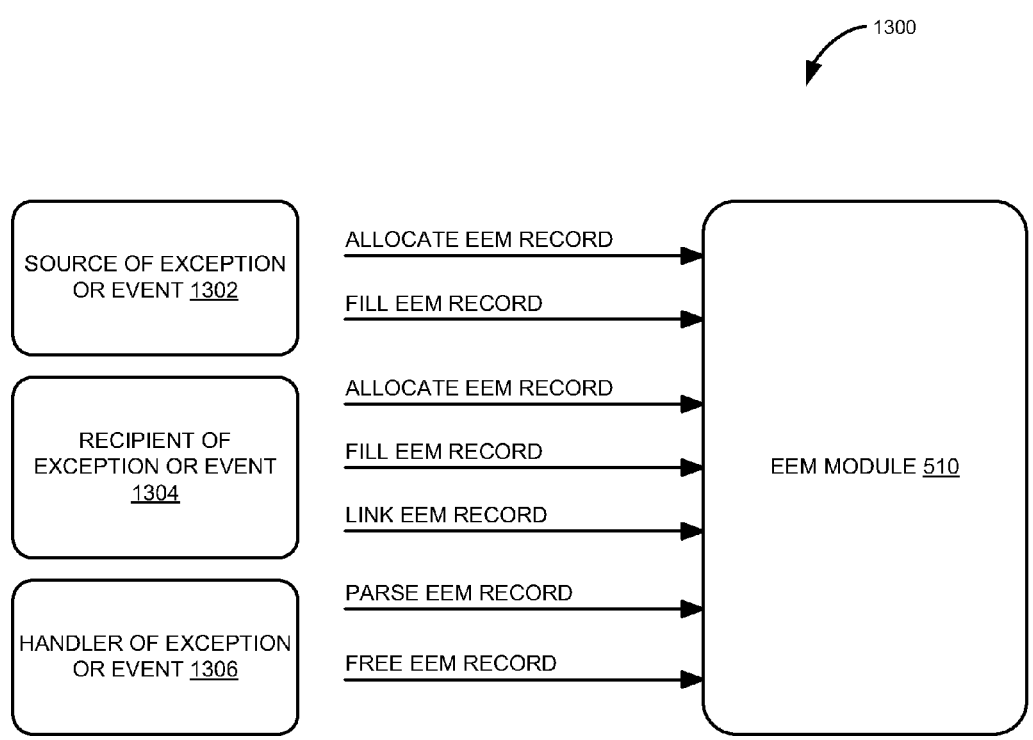
FIG. 13 illustrates a block diagram of how different types of users within the embedded software system use the available EEM APIs to invoke different EEM interfaces, according to one embodiment.

Referring now to FIG. 13, which is a block diagram 1300 illustrating how different types of users within the embedded software system use the available EEM APIs to invoke different EEM interfaces, according to one embodiment. The user which is a source of exception/event 1302 invokes the EEM API 560 to allocate and fill the exception/event record. When the exception/event record is passed to an overlying user, the overlying user is a recipient of the exception/event 1304. The recipient of the exception/event 1304 invokes three types of EEM APIs from the EEM module 510. Initially, the recipient of the exception/event 1304 invokes the EEM API 560 to allocate an exception/event record. Thereafter, the recipient of the exception/event 1304 invokes the EEM API 560 to populate the exception/event record. Subsequently, the recipient of the exception/event 1304 invokes the EEM API 560 to link the exception/event record passed by the source of exception/event 1302 and the exception/event record generated by the recipient of the exception/event 1304. Further, the user in the embedded software system acts as a handler of the exception/event 1306. The handler of the exception/event 1306 invokes the EEM API 560 to parse the exception/event record. Thereafter, the handler of the exception/event 1306 performs one or more actions to address the exception/event. After taking the action, the handler of the exception/event 1306 invokes the EEM API 560 to free the exception/event record.

Figure 14:
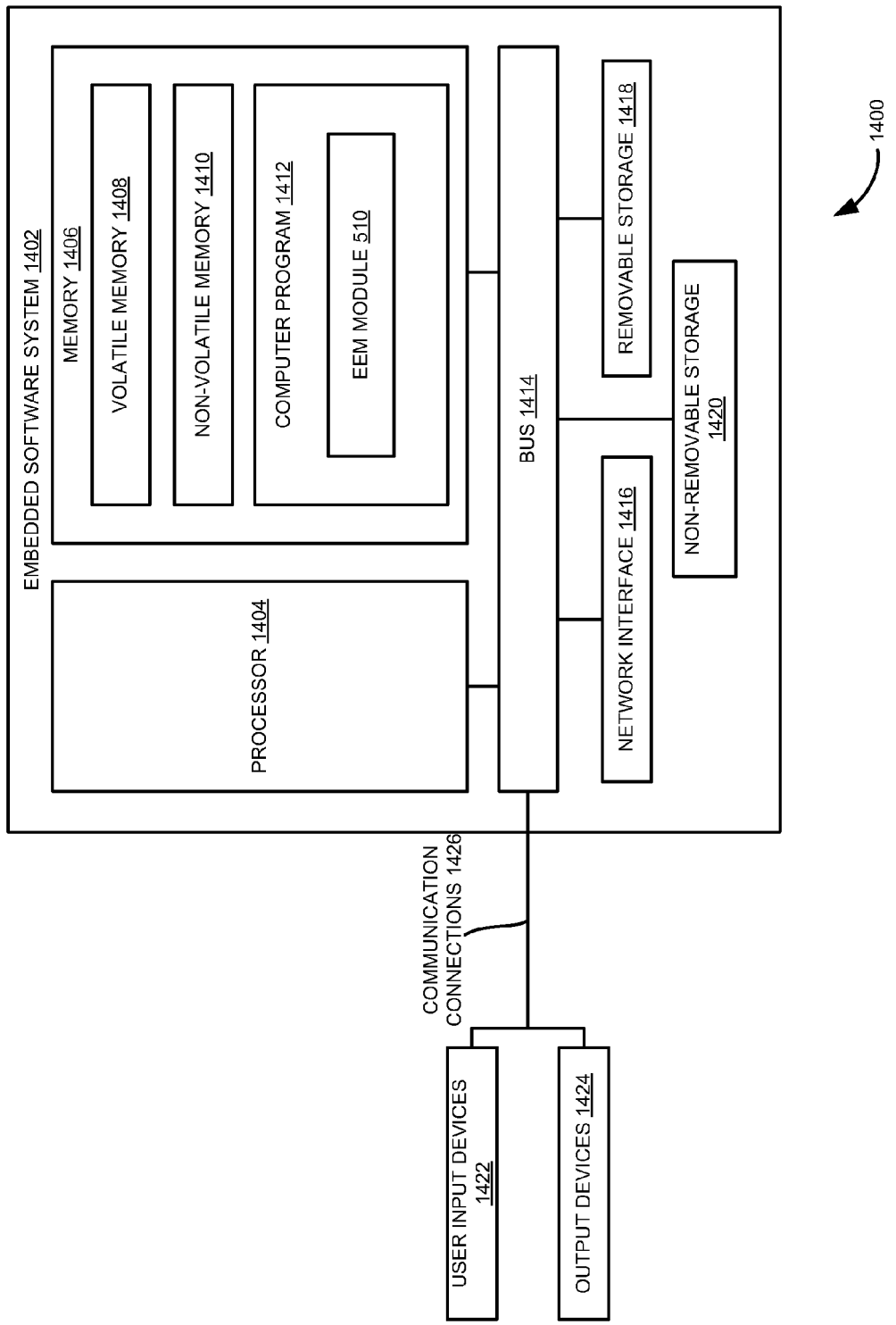
FIG. 14 illustrates a block diagram of the embedded software system having the EEM module for identifying, linking and handling exception/event generated in the embedded software system, according to one embodiment.

Referring now to FIG. 14, which is a block diagram 1400 illustrating an embedded software system 1402 including the EEM module 510 to identify, report and handle various events/exceptions encountered in the embedded software system, according to one embodiment. FIG. 14 and the following discussions are intended to provide a brief, general description of a suitable computing environment in which certain embodiments of the inventive concepts contained herein are implemented.

The embedded software system 1402 includes at least one processor (e.g., a processor 1404), memory 1406, a removable storage 1418, and a non-removable storage 1420. The embedded software system 1402 additionally includes a bus 1414 and a network interface 1416. As shown in FIG. 14, the embedded software system 1402 includes access to the computing system environment 1400 that includes one or more user input devices 1422, one or more output devices 1424, and one or more communication connections 1426 such as a network interface card and/or a universal serial bus connection.

Exemplary user input devices 1422 include a digitizer screen, a stylus, a trackball, a keyboard, a keypad, a mouse, touch screen and the like. Exemplary output devices 1424 include a display unit of the personal computer, a mobile device, and the like. Exemplary communication connections 1426 include a local area network, a wide area network (wired or wireless), and/or other network.

The memory 1406 further includes volatile memory 1408 and non-volatile memory 1410. A variety of computer-readable storage media are stored in and accessed from the memory elements of the embedded software system 1402, such as the volatile memory 1408 and the non-volatile memory 1410, the removable storage 618 and the non-removable storage 1420. The memory elements include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, Memory Sticks™, and the like.

The processor 1404, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 1404 also includes embedded controllers, such as generic or programmable logic devices or arrays, application specific integrated circuits, single-chip computers, smart cards, and the like.

Embodiments of the present subject matter may be implemented in conjunction with program modules, including functions, procedures, data structures, and application programs, for performing tasks, or defining abstract data types or low-level hardware contexts. Machine-readable instructions stored on any of the above-mentioned storage media may be executable by the processor 1404 of the embedded software system 1402. For example, a computer program 1412 includes machine-readable instructions capable of identifying, reporting, logging and handling exceptions/events generated in the embedded software system 1402, according to the teachings and herein described embodiments of the present subject matter. In one embodiment, the computer program 1412 is included on a compact disk-read only memory (CD-ROM) and loaded from the CD-ROM to a hard drive in the non-volatile memory 1410. The machine-readable instructions cause the embedded software system 1402 to operate according to the various embodiments of the present subject matter.

As shown, the computer program 1412 includes the EEM module 510. For example, the EEM module 510 can be in the form of instructions stored on a non-transitory computer-readable storage medium. When the instructions in the non-transitory computer-readable storage medium are executed by a computing device, causes the embedded software system 1402 to perform the one or more methods described with reference to FIGS. 1 through 13.

Thus, the described method and architecture provides a hierarchical approach for event and exception handling in an embedded software system using linked list approach. The described method also provides a centralized definition and identification mechanism for exceptions and events with decentralized reporting and handling. Further, the method and architecture supports multiple types of exceptions/events and can be extended to incorporate new types of exceptions/events. Furthermore, the method and architecture supports both synchronous and asynchronous exceptions. Additionally, the method and architecture is integrated with software logging framework and statistics collection framework for providing reliable logging and analytics services.

Although certain methods, systems, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method for providing a dedicated exception and event management (EEM) framework for exception and event management in an embedded software system using an EEM module, comprising:
   uniquely identifying each of exceptions/events originated from users and severity categorization of the exceptions/events using an event and exception identification module (EEIM), wherein the users are software subsystems, software layers, software modules and software sub-modules in the embedded software system, wherein the users are managed using an application control software (ACS) which is a centralized intelligence and control logic;
   reporting information regarding the exceptions/events by various users using an event and exception reporting module (EERM), wherein reporting information regarding the exceptions/events comprises:
      allocating a first record to a user to fill exception/event information by the EERM upon receiving a first request from the user;
      transferring the first record by the user to a subsequent overlying user;
      allocating a second record to the subsequent overlying user by the EERM to fill additional exception/event information to supplement the exception/event information populated in the first record upon receiving a second request from the subsequent overlying user;
      enabling the subsequent overlying user to link the second record with the first record by the EERM and transferring the linked records by the subsequent overlying user to a next subsequent overlying user; and
      enabling repetition of the above steps for each subsequent overlying user by the EERM until the linking of records of all subsequent overlying users is completed such that at a final overlying layer of the embedded software system, all the records of all the underlying layers are linked and reported as a linked list;
   logging information associated with one or more of the reported exceptions/events using the linked list of linked records using an event and exception logging module (EELM); and
   handling, using an event and exception handling module (EEHM), the reported exceptions/events to keep applications running without causing an unexpected behavior in the embedded software system using the linked list of linked records,
   wherein the EEM module interacts with different types of the users and the ACS within the embedded software system though EEM application programming interfaces (APIs),
   wherein the EEM module includes the EEM framework that facilitates the event and exception management activities exported through the EEM APIs,
   wherein the EEM framework includes the EEIM, EERM, EELM and EEHM that are coupled to each other, and
   wherein the EEIM, EERM, EELM and EEHM are coupled to the ACS and the users through the EEM APIs.

2. The method of claim 1, wherein uniquely identifying each of the exceptions/events originated from the users comprises:
   registering each of the users using a unique base identity (ID) during initialization of the users; and
   using the unique base IDs of the users to uniquely identify the exceptions/events generated by the users.

3. The method of claim 2, wherein each registered user in the embedded software system includes a registered callback function to report asynchronous exceptions and the callback is implemented by overlying users.

4. The method of claim 2, further comprising:
   providing the ability to each user to extend its unique base ID for its internal modules and sub-modules to further assist in identification of an exact source of exception/event occurrence.

5. The method of claim 1, wherein the exception/event record includes the associated unique base IDs and module or sub-module base IDs where the exception/event is encountered and details selected from the group consisting of a line of code generating the event/exception, a name of a function generating the event/exception, string description of the exception/event in words, exception/event codes, severity of the event/exception and any debug parameters or information associated with the event/exception.

6. The method of claim 1, wherein reporting the information regarding the exceptions/events through the various software layers, software subsystems and software modules for use by the application comprises:
   reporting the information regarding the exception/event records using one or more data structures; and
   using the same data structures by all the users to maintain consistency of reporting, management of the memory for these exception/event records in the embedded software system and deterministic parsing of the exception/event information reported using an event and exception parsing module (EEPM) of the EEM framework, wherein the EEIM, EERM, EELM, EEPM and EEHM are coupled to the ACS and the users through the EEM APIs.

7. The method of claim 1, wherein logging the information associated with the one or more of the reported exceptions/events using the logging framework comprises:
   determining the one or more of the reported exceptions/events to be logged using a logging filter of the EELM;
   filtering the logged exceptions/events based on logging criteria using the logging filter; and
   logging the information associated with the filtered exceptions/events at one or more destinations using the using a logger of the EELM.

8. The method of claim 7, wherein logging the information associated with the one or more of the reported exceptions/events using the logging framework comprises:

logging the information associated with the one or more of the reported exceptions/events in a batch mode using a logging memory of the EELM, wherein the exception/event logs are temporarily stored in memory and periodically routed to the one or more destinations; and logging the batch mode traces to the one or more destinations in a low priority or background mode to minimize impact on the core processing load of the embedded software system using the lobbing memory.

9. The method of claim 1, wherein handling the reported exceptions/events to keep the applications running without causing the unexpected behavior in the embedded software system comprises:

defining a hierarchical framework for handling the reported exceptions/events originated from each of the users based on an invoked user functionality using the EERM;

parsing each of the linked exception/event records for root cause analysis to determine the source of the exception/event using an EEPM, and taking necessary actions based on the outcome of the parsing to keep the applications running without causing the unexpected behavior using the EEHM.

10. The method of claim 9, further comprising:
passing the exceptions/events generated by each of the users through the hierarchical framework using the EERM until the exceptions/events are handled.

11. The method of claim 9, further comprising:
freeing the memory allocated for the record using an EEM record memory management module of the EERM and continuing the normal course of operation upon handling the exceptions/events by the user.

12. The method of claim 1, further comprising:
computing statistical information associated with each occurrence of each exception/event using a logging statistics module of the EELM for root cause analysis to determine a source of the exception/event.

13. The method of claim 1, wherein the exception is a synchronous exception or an asynchronous exception.

14. The method of claim 1, wherein each of the first record and the second record comprises a region of memory.

15. The method of claim 1, wherein the first record is allocated to the user and the second record is allocated to the subsequent overlying user using an EEM record memory management module of the EERM.

16. The method of claim 1, wherein the subsequent overlying user is enabled to link the second record with the first record using a record structure linking module of the EERM.

17. An embedded system, comprising:
a processor;
memory operatively coupled to the processor, wherein the memory comprises:
  users, wherein the users are subsystems, modules and sub-modules in the embedded software system;
  application control software (ACS coupled to the users, the ACS is a centralized intelligence and control logic to manage the users:
  an exception and event management (EEM) module for providing a dedicated exception and event management, where in EEM to:
    identify, report, log, and handle the exceptions/event generated by the users:
    interact with different types of the users and ACS within the embedded software system though EEM application programming interfaces (APIs);
    include the EEM framework that facilitates all the event and exception management activities exported through the EEM APIs, wherein the EEM framework further comprises:
      an event and exception identification module (EEIM) configured to uniquely identify each of exceptions/events originated from the users and severity categorization of the exceptions/events;
      an event and exception reporting module (EERM) configured to report information regarding exceptions/events by various users, wherein the EERM is configured to:
        allocate a first record to a user to fill exception/event information upon receiving a first request from the user, the user transfers the first record to a subsequent overlying user upon filling the exception/event information;
        allocate a second record to the subsequent overlying user to fill additional exception/event information to supplement the exception/event information populated in the first record upon receiving a second request from the subsequent overlying user;
        enable the subsequent overlying user to link the second record with the first record, wherein the subsequent overlying user transfers the linked records to a next subsequent overlying user; and
        enable repetition of the above steps for each subsequent overlying user until the linking of the exception/event records of all subsequent overlying users is completed such that at a final overlying layer of the embedded software system, all the records of all the underlying layers are linked and reported as a linked list;
      an event and exception logging module (EELM) configured to log information associated with one or more of the reported exceptions/events using the linked list of linked records;
      an event and exception parsing module (EEPM) configured to parse the linked list of linked records in order to handle the event/exception; and
      an event and exception handling module (EEHM) enables at least one of the users to handle the reported exceptions/events to keep applications running without causing an unexpected behavior in the embedded software system using the linked list of linked records,
    wherein the EEIM, EERM, EELM, EEPM and EEHM are coupled to each other, and
    wherein the EEIM, EERM, EELM, EEPM and EEHM are coupled to the ACS and the users through the EEM APIs.

18. The system of claim 17, wherein the EEIM module is configured to:
register each of the users using a unique base identity (ID) during initialization of the users; and
use the unique base IDs of the users to uniquely identify the exceptions/events generated by the users.

19. The system of claim 17, wherein the exception/event record includes the associated unique base IDs and module or sub-module base IDs where the exception/event is encountered and details selected from the group consisting of a line of code generating the event/exception, a name of a function generating the event/exception, string description of the exception/event in words, exception/event codes, severity of the event/exception and any debug parameters or information associated with the event/exception.

20. The system of claim 17, wherein the EEM module is configured to:
define pre-configured rules and policies in the EELM for maintaining consistency of logs from the linked records.

21. The system of claim 17, wherein the EELM comprises:
a logging filter to:
determine the one or more of the reported exceptions/events to be logged; and
filter the logged exceptions/events based on logging criteria; and
a logger to log the information associated with the filtered exceptions/events at one or more destinations.

22. The system of claim 21, wherein the EELM is configured to log the exception/event information in the one or more destinations including providing a standard output to a terminal, writing to a file, sending over a network to a remote server, and writing to a specific region of memory.

23. The system of claim 17, wherein the EEM module is configured to:
define a hierarchical framework for handling the reported exceptions/events originated from each of the users based on an invoked user functionality using the EERM;
parse each of the linked and defined exception/event records for root cause analysis to determine the source of the exception/event using the EEPM; and
take necessary actions based on the outcome of the parsing to keep the applications running without causing the unexpected behavior using the EEIM.

24. The system of claim 23, wherein the EEM module is configured to:
implement a standard syntax for the information to be logged from the exception/event records that the EEM module is currently parsing.

25. The system of claim 17, wherein the EEM APIs are configured to:
allocate the exception/event record when the exception/event is generated in the user;
fill the exception/event record;
link the exception/event records created by the users as they propagate across the users of the embedded software system;
parse the exception/event record when an user intends to handle the exception/event; and
free the exception/event record upon taking necessary actions by the user to address the exception/event raised.

26. The system of claim 17, wherein the EERM comprises:
an EEM record memory management module to allocate the first record to the user and the second record to the subsequent overlying user.

27. The system of claim 17, wherein the EERM comprises:
a record structure linking module to enable the subsequent overlying user to link the second record with the first record.

28. A non-transitory computer-readable storage medium for providing a dedicated exception and event management (EEM) framework for exception and event management in an embedded software system using an EEM module, having instructions that when executed by a computing device, cause the computing device to perform a method comprising:
uniquely identifying each of exceptions/events originated from users and severity categorization of the exceptions/events using an event and exception identification module (EEIM), wherein the users are subsystems, modules and sub-modules in the embedded software system, wherein the users are managed using an application control software (ACS) which is a centralized intelligence and control logic;
reporting information regarding exceptions/events by various users using an event and exception reporting module (EERM), wherein reporting the information regarding exceptions/events comprises:
allocating a first record to a user to fill exception/event information by the EERM upon receiving a first request from the user;
transferring the first record by the user to a subsequent overlying user;
allocating a second record to the subsequent overlying user by the EERM to fill additional exception/event information to supplement the exception/event information populated in the first record upon receiving a second request from the subsequent overlying user;
enabling the subsequent overlying user to link the second record with the first record by the EERM and transferring the linked records by the subsequent overlying user to a next subsequent overlying user; and
enabling repetition of the above steps for each subsequent overlying user by the EERM until the linking of the exception/event records of all subsequent overlying users is completed such that at a final overlying layer of the embedded software system, all the records of all the underlying layers are linked and reported as a linked list;
logging information associated with one or more of the reported exceptions/events using the linked list of linked records using an event and exception logging module (EELM); and
handling, using an event and exception handling module (EEHM), the reported exceptions/events to keep applications running without causing an unexpected behavior in the embedded software system using the linked list of linked records,
wherein the EEM module interacts with different types of the users and the ACS within the embedded software system though EEM application programming interfaces (APIs),
wherein the EEM module includes the EEM framework that facilitates the event and exception management activities exported through the EEM APIs,
wherein the EEM framework includes the EEIM, EERM, EELM and EEHM that are coupled to each other, and
wherein the EEIM, EERM, EELM and EEHM are coupled to the ACS and the users through the EEM APIs.

29. The non-transitory computer-readable storage medium of claim 28, wherein uniquely identifying each of the exceptions/events originated from the users comprises:
registering each of the users using a unique base identity (ID) during initialization of the users; and
using the unique base IDs of the users to uniquely identify the exceptions/events generated by the users.

30. The non-transitory computer-readable storage medium of claim 28, wherein the exception/event record includes the associated unique base IDs and module or sub-module base IDs where the exception/event is encountered and details selected from the group consisting of a line of code generating the event/exception, a name of a function generating the event/exception, string description of the exception/event in words, exception/event codes, severity of the event/exception and any debug parameters or information associated with the event/exception.

31. The non-transitory computer-readable storage medium of claim 28, wherein logging the information associated with the one or more of the reported exceptions/events using the logging framework comprises:

determining the one or more of the reported exceptions/events to be logged using a logging filter of the EELM;

filtering the logged exceptions/events based on logging criteria using the logging filter; and logging the information associated with the filtered exceptions/events at one or more destinations using the logging framework using a logger of the EELM.

32. The non-transitory computer-readable storage medium of claim 28, wherein handling the reported exceptions/events to keep applications running without causing the unexpected behavior in the embedded software system comprises:

defining a hierarchical framework for handling the reported exceptions/events originated from each of the users based on an invoked user functionality using the EERM;

parsing each of the linked and defined exception/event records for root cause analysis to determine the source of the exception/event using an EEPM; and taking necessary actions based on the outcome of the parsing to keep the applications running without causing the unexpected behavior using the EEHM.

* * * * *